(12) United States Patent
Chien et al.

(10) Patent No.: US 8,200,528 B2
(45) Date of Patent: Jun. 12, 2012

(54) FACTOR ANALYSIS SYSTEM AND ANALYSIS METHOD THEREOF

(75) Inventors: Chen-Fu Chien, Hsinchu (TW); Chih-Han Hu, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 102 days.

(21) Appl. No.: 12/907,237

(22) Filed: Oct. 19, 2010

(65) Prior Publication Data

US 2012/0029957 A1    Feb. 2, 2012

(30) Foreign Application Priority Data

Aug. 2, 2010   (TW) .............................. 99125658 A

(51) Int. Cl.
*G06Q 10/00*   (2006.01)
(52) U.S. Cl. ............ 705/7.39; 705/7.37; 705/7.38; 705/7.41; 705/7.28; 705/7.11
(58) Field of Classification Search .................. None
See application file for complete search history.

(56) References Cited

U.S. PATENT DOCUMENTS

| | | | | |
|---|---|---|---|---|
| 5,347,446 A * | 9/1994 | Iino et al. | | 700/29 |
| 5,462,613 A * | 10/1995 | Glodowski et al. | | 148/500 |
| 5,630,070 A * | 5/1997 | Dietrich et al. | | 705/7.23 |
| 5,727,161 A * | 3/1998 | Purcell, Jr. | | 705/7.36 |
| 5,740,033 A * | 4/1998 | Wassick et al. | | 700/29 |
| 6,210,983 B1 * | 4/2001 | Atchison et al. | | 438/14 |
| 6,259,959 B1 * | 7/2001 | Martin | | 700/99 |
| 6,684,190 B1 * | 1/2004 | Powers et al. | | 705/36 R |
| 6,727,106 B1 * | 4/2004 | Ankutse et al. | | 438/5 |
| 6,970,758 B1 * | 11/2005 | Shi et al. | | 700/108 |
| 7,346,538 B2 * | 3/2008 | Reardon | | 705/7.29 |
| 7,593,880 B2 * | 9/2009 | Chalermkraivuth et al. | | 705/36 R |
| 7,650,576 B2 * | 1/2010 | Becerra, Jr. | | 715/771 |
| 7,676,738 B2 * | 3/2010 | Hoffmann et al. | | 715/213 |
| 7,792,595 B1 * | 9/2010 | Bomholt et al. | | 700/29 |
| 7,895,578 B2 * | 2/2011 | Tsai et al. | | 717/125 |

(Continued)

OTHER PUBLICATIONS

Drennan PG and McAndrew CC (2003). Understanding MOSFET Mismatch for Analog Design. IEEE Journal of Solid-State Circuits, vol. 38(3): 450-456.*
Ping-Feng Pai, Ching-En Lee, Tzu-Haw Su (2004). A daily production model for wafer fabrication. Int J Adv Manuf Technol. 23: 58-63.*

(Continued)

*Primary Examiner* — Lynda Jasmin
*Assistant Examiner* — Brett Feeney
(74) *Attorney, Agent, or Firm* — WPAT, P.C.; Anthony King

(57) ABSTRACT

A factor analysis system and method thereof is disclosed. The factor analysis system comprises a data receiving module for receiving a plurality of factors having influence on a target total value, a plurality of base values corresponding to the factors, and a target improvement percentage; a first computing unit for computing a reference target total value and a plurality of upgraded target total values; a second computing unit using the upgraded target total values and the reference target total value to compute the sensitivity of each of the factors; and a processing module for multiplying a factor improvement of each factor in percentage point by the factor sensitivity of each factor to obtain the level of contribution of each factor to the target total value. Through the factor analysis, a decision maker can decide the optimal combination of different factor improvements for achieving the planned target total value.

10 Claims, 8 Drawing Sheets

U.S. PATENT DOCUMENTS

| | | | |
|---|---|---|---|
| 7,899,756 B2 * | 3/2011 | Rizzolo et al. | 705/300 |
| 7,991,577 B2 * | 8/2011 | Havener et al. | 702/179 |
| 2002/0103688 A1 * | 8/2002 | Schneider | 705/8 |
| 2002/0198696 A1 * | 12/2002 | Sanchez et al. | 703/14 |
| 2004/0034555 A1 * | 2/2004 | Dismukes et al. | 705/7 |
| 2004/0204775 A1 * | 10/2004 | Keyes et al. | 700/29 |
| 2004/0267676 A1 * | 12/2004 | Feng et al. | 705/400 |
| 2005/0209912 A1 * | 9/2005 | Veeningen et al. | 705/11 |
| 2005/0256661 A1 * | 11/2005 | Salsbury et al. | 702/113 |
| 2006/0089920 A1 * | 4/2006 | Ramesh et al. | 705/400 |
| 2006/0117012 A1 * | 6/2006 | Rizzolo et al. | 707/9 |
| 2007/0016432 A1 * | 1/2007 | Piggott et al. | 705/1 |
| 2008/0140469 A1 * | 6/2008 | Iqbal et al. | 705/7 |
| 2009/0005894 A1 * | 1/2009 | Bomholt et al. | 700/97 |
| 2009/0063094 A1 * | 3/2009 | Havener et al. | 702/179 |
| 2009/0112344 A1 * | 4/2009 | Nackaerts et al. | 700/103 |
| 2010/0121474 A1 * | 5/2010 | Bomholt et al. | 700/104 |
| 2011/0112887 A1 * | 5/2011 | Rizzolo et al. | 705/7.28 |
| 2011/0251812 A1 * | 10/2011 | Gurov et al. | 702/82 |

OTHER PUBLICATIONS

Wu SD, Erkoc M and Karabuk S (2005). Managing Capacity in the High-Tech Industry: A Review of Literature. The Engineering Economist. 50: 125-158.*

Sha DY and Liu CY (2005). Decision making for shop floor control integration strategies in wafer fabrication using tabu search based methodology. Int. J. Manufacturing Technology and Management. 7(1): 83-103.*

Wang Cn and Wang Ch (2007). A simulated model for cycle time reduction by acquiring optimal lot size in semiconductor manufacturing. Int J Adv Manuf Technol. 34:1008-1015.*

Chung Sh, Lee Ahi, Huang Cy and Chuang Cc (2008). Capacity pricing mechanism for wafer fabrication. Computers & Industrial Engineering. 55: 647-662.*

* cited by examiner

FACTOR ANALYSIS SYSTEM AND ANALYSIS METHOD THEREOF

FIELD OF THE INVENTION

The present invention relates to a factor analysis system and an analysis method thereof; and more particularly to a factor analysis system and an analysis method thereof for analyzing factors that have influence on the decision making.

BACKGROUND OF THE INVENTION

In the process of business operation, there are many key factors having deep influence on the realization of an operation target. Most businesses pay more attention to the technical improvement in order to get more orders without knowing that real business operation performance comes from not only technical improvement but also good business flow management.

Business flow management plays an important role in the allocation of business resources. Improper resource allocation would cause unnecessary waste of many business resources and reduce the chance of making increased profits, which in turn has adverse influence on the potential for constant growth of the business. Under this condition, a manager has to take more time and make more effort to upgrade the technical level, in order to increase revenue for achieving the projected result. Further, the waste of business resources caused by improper allocation will become worse with the expansion of business.

Therefore, it is very important for a business to understand the key influential factors in achieving the operation target thereof. Since there are so many influential factors, it is impossible for a manager to handle all these factors at the same time. The manager has to locate from all these factors the most important ones. By managing and improving the most important factors, the business can be properly managed in a simplified manner while increasing the operation performance thereof. With past experiences, the operation target can be effectively measured and evaluated using some key performance indexes. However, every one single index covers only very limited scope and fails to comprehensively and effectively reflect the current state of operation. Without effective performance indexes, it is difficult to timely propose suitable solution to upgrade the performance. In addition, since every individual index has its own range of value, the one single index is not necessarily suitable for evaluating the operation target in all situations. In the case the operation performance can not be evaluated with one single index and there is not a complete set of rules for evaluation, the decision maker will be prevented from making the optimal managing policy for the business.

On the other hand, it is possible to examine more aspects of the operation performance by selecting multiple key indexes to evaluate the business operation target. While different indexes can compensate with one another to reflect the operation performance in different ways, they tend to confuse and exhaust the manager. Since different indexes are related to one another in a relatively complicated way, a manager requires professional knowledge or assistance from related references to make sure the influence of different indexes on one another, in order to make most suitable decision in response to the current operating condition. Even if the manager tries to take all the indexes into consideration, there are times these indexes are in conflict with one another and the manager fails to find any suitable rule for deciding the right indexes for making comprehensive evaluation. Therefore, it has become an important requirement in the field of business management and operation to work out a factor analysis system and method capable of assisting a decision maker to manage the target value in an easy and right way.

SUMMARY OF THE INVENTION

A primary object of the present invention is to provide a factor analysis system and a analysis method thereof, so as to evaluate and compare the sensitivities of many different factors and thereby find the key influential factors to help a decision maker in making right management targets and policies.

To achieve the above and other objects, the factor analysis system according to the present invention comprises a data receiving module, a first computing unit, a second computing unit, and a processing module. The data receiving module receives a plurality of factors having influence on a target total value, a plurality of base values corresponding to the factors, and a target improvement percentage. The factors comprise a first factor and a second factor, the base values comprise a first base value and a second base value, and the target improvement percentage comprises a first factor improvement in percentage point and a second factor improvement in percentage point. The first computing unit is connected to the data receiving module, and uses the base values of the factors as a basis to compute a reference target total value, uses the first factor increased by one percentage point and the second base value of the second factor as a basis to compute a first upgraded target total value, and uses the second factor increased by one percentage point and the first base value of the first factor as a basis to compute a second upgraded target total value. The second computing unit is connected to the first computing unit and uses the first upgraded target total value and the reference target total value as a basis to compute a first factor sensitivity, and uses the second upgraded target total value and the reference target total value as a basis to compute a second factor sensitivity. The processing module is connected to the second computing unit and the data receiving module for multiplying the first factor improvement by the first factor sensitivity to obtain a first factor contribution indicating a level of contribution of the first factor to the target total value, and multiplying the second factor improvement by the second factor sensitivity to obtain a second factor contribution indicating a level of contribution of the second factor to the target total value.

To achieve the above and other objects, the factor analysis method according to the present invention comprises the following steps: providing a data receiving module for receiving a plurality of factors that have influence on a target total value, a plurality of base values corresponding to the factors, and a target improvement percentage; the factors comprising a first factor and a second factor, the base values comprising a first base value and a second base value, and the target improvement percentage comprising a first factor improvement in percentage point and a second factor improvement in percentage point; using a first computing unit to compute a reference target total value based on the base values of the factors, and compute a first upgraded target total value based on the first factor increased by one percentage point and the second base value of the second factor, and compute a second upgraded target total value based on the second factor increased by one percentage point and the first base value of the first factor; using a second computing unit to compute a first factor sensitivity based on the first upgraded target total value and the reference target total value, and compute a second factor sensitivity based on the second upgraded target total value and the reference target total value; and using a processing module to multiply the first factor improvement by the first factor sensitivity to obtain a first factor contribution indicating a level of contribution of the first factor to the target total value, and multiply the second factor improvement by the second factor sensitivity to obtain a second factor contribution indicating a level of contribution of the second factor to the target total value.

The factor analysis system of the present invention further comprises a composite ordination diagram connected to the processing module for listing the factor sensitivities and the factor improvements of the factors.

In the present invention, the data receiving module further receives a plural pairs of upper and lower bounds that respectively define a change range of the factors. The upper bounds comprise a first upper bound and a second upper bound, and the lower bounds comprise a first lower bound and a second lower bound.

The factor analysis system of the present invention further comprises a third computing unit connected to the data receiving module. The third computing unit uses the first upper and lower bounds of the first factor as a basis to compute a first factor related target value change range, and uses the second upper and lower bounds of the second factor as a basis to compute a second factor related target value change range.

The factor analysis system of the present invention further comprises a target value change range ordination diagram connected to the third computing unit for listing the target value change range related to each of the factors.

The factor analysis system and the analysis method thereof according to the present invention have one or more of the following advantages:

(1) The influence of each of many different factors on the target total value is provided, so that a manager could determine the key influential factors and accordingly make right decision to achieve the target total value.

(2) The factor analysis system and the analysis method thereof evaluate and compare the sensitivities of many different factors to find key influential factors, so as to help the decision maker in deciding the optimal combination of different factor improvements for effectively achieving the planned target total value.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
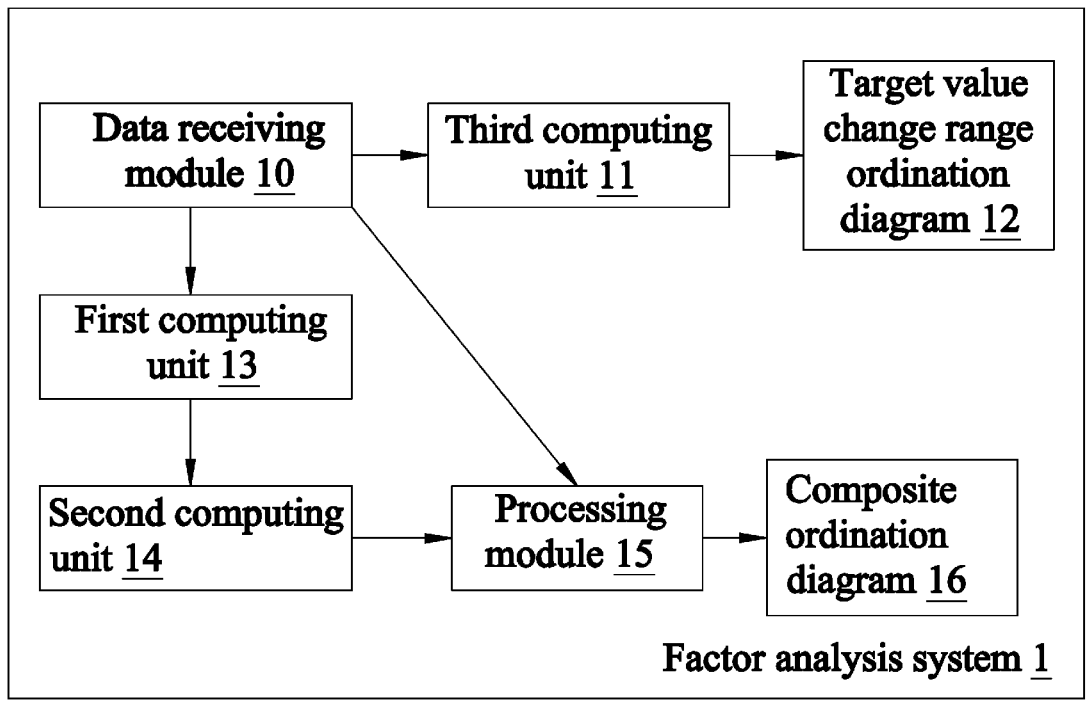
FIG. 1 is a block diagram of a factor analysis system according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is a block diagram showing a factor analysis system 1 according to a first embodiment of the present invention. As shown, the factor analysis system 1 comprises a data receiving module 10, a third computing unit 11, a target value change range ordination diagram 12, a first computing unit 13, a second computing unit 14, a processing module 15, and a composite ordination diagram 16. The data receiving module 10 receives a plurality of factors that have influence on a target total value, a plurality of base values corresponding to the factors, and a plural pairs of upper and lower bounds respectively defining a change range of the factors. The factors comprise a first factor and a second factor; the base values comprise a first base value and a second base value; the upper bounds comprise a first upper bound and a second upper bound; and the lower bounds comprise a first lower bound and a second lower bound. The third computing unit 11 is connected to the data receiving module 10, and uses the first upper and lower bounds of the first factor as a basis to compute a first factor related target value change range, and uses the second upper and lower bounds of the second factor as a basis to compute a second factor related target value change range. The target value change range ordination diagram 12 is connected to the third computing unit 11 for listing the target value change range related to each of the factors in descending order.

The data receiving module 10 further receives a target improvement percentage, which comprises a first factor improvement in percentage point and a second factor improvement in percentage point. The first computing unit 13 is connected to the data receiving module 10 and uses the base values of the factors as a basis to compute a reference target total value. The first computing unit 13 also uses the first factor increased by one percentage point and the second base value of the second factor as a basis to compute a first upgraded target total value. The first computing unit 13 also uses the second factor increased by one percentage point and the first base value of the first factor as a basis to compute a second upgraded target total value. The second computing unit 14 is connected to the first computing unit 13, and uses the first and second upgraded target total values as well as the reference target total value as a basis to compute a first factor sensitivity and a second factor sensitivity. The processing module 15 is connected to the second computing unit 14 and the data receiving module 10, and multiplies the first factor improvement by the first factor sensitivity to obtain a first factor contribution for indicating a level of contribution of the first factor to the target total value, and multiplies the second factor improvement by the second factor sensitivity to obtain a second factor contribution for indicating a level of contribution of the second factor to the target total value. The composite ordination diagram 16 is connected to the processing module 15 and comprises a left half and a right half. The left half of the composite ordination diagram 16 shows the sensitivity of each of the factors in descending order, and the right half of the composite ordination diagram 16 correspondingly shows the factor improvement of each of the factors.

In the present invention, the data receiving module 10 can comprise, but not limited to, an input keyboard and a data-receiving resident program installed in the operating system. The first computing unit 13, the second computing unit 14 and the third computing unit 11 can respectively comprise, but not limited to, a computing integrated circuit (IC), and the processing module 15 can comprise, but not limited to, a processing IC. Alternatively, the first, second and third computing units 13, 14 and 11 together with the processing module 15 can be integrated into an application-specific integrated circuit (ASIC) without being limited thereto. The target value change range ordination diagram 12 and the composite ordination diagram 16 may also be ordination resident programs installed in the operating system without being limited thereto.

The factor analysis system and method of the present invention will now be explained in more details based on a second embodiment thereof, which is applied in a wafer plant to analyze an overall profit-making decision thereof. The following explanation will comprise the computing and comparing of the target value change ranges obtainable from different factors, how the factors will affect the target total value when the factors are respectively improved by one percentage point, and how to set a combination of different factor improvements. First, it is understood the target total value is affected by total revenue and total cost; that is, the target total value is obtained by deducting total cost from total revenue. Further, total revenue is affected by some factors, including start wafer quantity (Q), yield (Y), bottleneck utility (U), and wafer sale price (P). The relation between the total revenue and these factors can be expressed by the following calculation formula:

Total revenue=$(Q \times Y \times U) \times P$

As to the total cost, it comprises bare wafer cost (Cb) and process cost (Cp), and can be expressed by the following formula:

Total cost=$Q \times Cb + Q \times Cp$

Therefore, the target total value can be expressed by the following formula:

$$\begin{aligned}
\text{Target total value} &= \text{Total profit} \\
&= \text{Total revenue} - \text{Total cost} \\
&= Q \times Y \times U \times P - (Q \times Cb + Q \times Cp)
\end{aligned}$$

In the illustrated second embodiment, there are total six factors that have influence on the profit of the wafer plant, namely, the bottleneck utility, the start wafer quantity, the bare wafer cost, the wafer sale price, the yield, and the process cost. The data receiving module 10 receives not only the factors, but also the base value of each of the factors, and the upper and lower bounds defining the possible change range of each of the factors, as shown in the following Table 1. Then, a one-way target value change range analysis based on the factor of "bottleneck utility" is conducted. In this analysis, the factor of bottleneck utility has a base value of 100%, which is also the value being used in an initial analysis. In this second embodiment, the highest possible value in the change range of the bottleneck utility is 110%, which is also a possible upper bound of the factor of bottleneck utility; and the lowest possible value in the change range of the bottleneck utility is 50%, which is also a possible lower bound of the factor of bottleneck utility.

TABLE 1

Base Values, Lower Bound and Upper Bound of Different Factors

| Factor | Unit | Base Value | Lower Bound | Upper Bound |
|---|---|---|---|---|
| Bottleneck Utility (U) | % | 100% | 50% | 110% |
| Start Wafer Quantity (Q) | Piece | 18000 | 0 | 23000 |
| Bare Wafer Cost (Cb) | US$ | (89.3) | (100) | (71.4) |
| Wafer Sale Price (P) | US$ | 1778 | 1623 | 2230 |
| Production Line Yield (Y) | % | 90.37% | 87.11% | 94.70% |
| Process Cost (Cp) | US % | (1000) | (1150) | (880) |

In the one-way target value change range analysis, one factor at a time is varied while other factors are kept at respective base value, so as to observe changes in the target total value. The third computing unit 11 uses the above calculation formula defining the target total value to compute the influence of each of the factors within the possible change range thereof on the target total value. For example, the target total values that can be obtained when the factor of bottleneck utility is at the lower and the upper bound thereof can be computed as follows:

Target total value obtainable when the bottleneck utility is at the lower bound thereof $$= (18000 \times 90.37 \times 50\% \times 1778) - (18000 \times 89.3 + 18000 \times 1000)$$

$$= -5{,}146{,}392.6 \text{ (US\$)}$$

Target total value obtainable when the bottleneck utility is at the upper bound thereof $$= (18000 \times 90.37 \times 110\% \times 1778) - (18000 \times 89.3 + 18000 \times 1000)$$

$$= 12{,}206{,}816.28 \text{ (US\$)}$$

Figure 2:
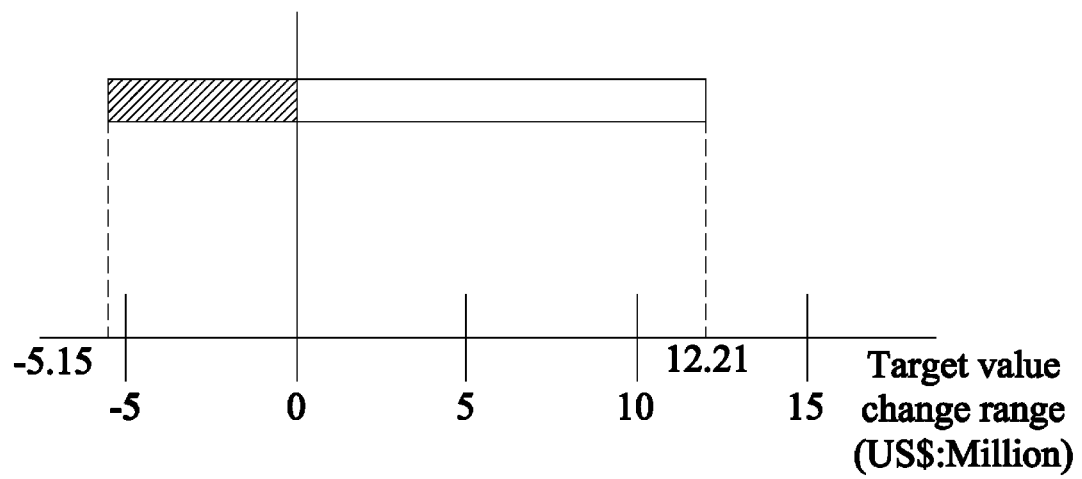
FIG. 2 is a diagram analyzing the target value change range obtainable from a change in one single factor, computed based on a second embodiment of the present invention.
Figure 3:
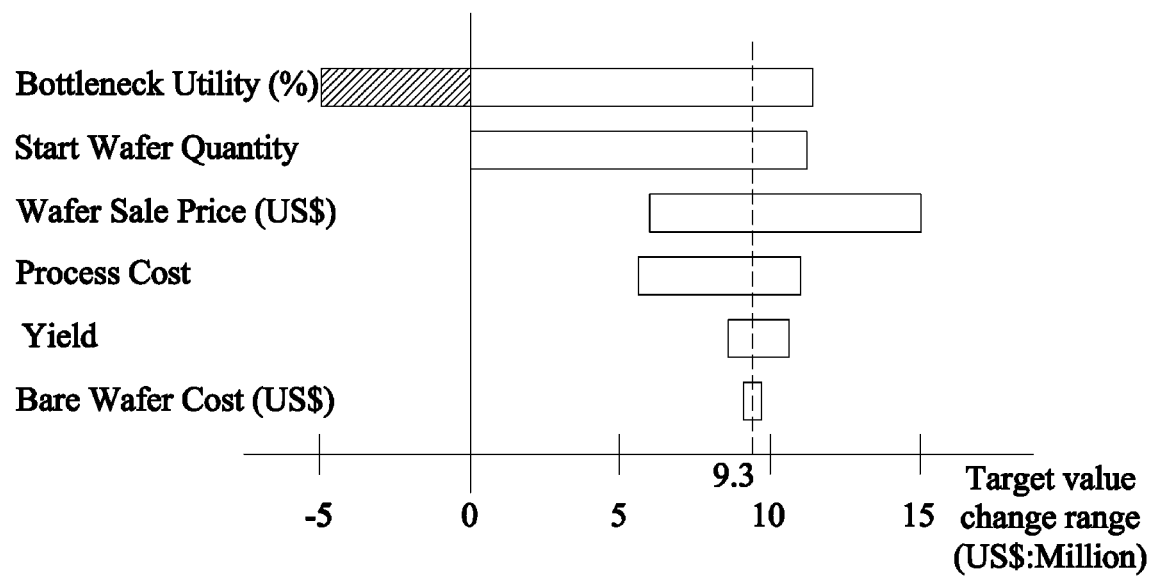
FIG. 3 is a diagram analyzing different target value change ranges obtainable from a change in each of multiple factors, computed based on the second embodiment of the present invention.

FIG. 2 is a diagram showing the results from the above one-way target total value change range analysis based on the second embodiment of the present invention. As can be seen in FIG. 2, the horizontal axis indicates different target total values computed according to the possible changes of the factor of bottleneck utility within the upper and lower bounds thereof. Following the above-described computing method based on the bottleneck utility, the third computing unit 11 can sequentially compute the target total values according to the possible changes of other factors within the upper and lower bounds thereof. Please refer to FIG. 3 that is a diagram showing the results from a multifactor target total value change range analysis based on the second embodiment of the present invention. As can be seen in FIG. 3, among different factors involving in the profit-making decision of the wafer plant, the factor of bare wafer cost has the least sensitivity, and the factor of bottleneck utility has the highest sensitivity. Also, it is observed loss will occur when the bottleneck utility is lower than 68%. In the second embodiment, since the factor of production line yield has already reached a stable level with a relatively small change range, the influence of this factor on the target total value is small compared to other factors.

The second embodiment will now be further described with the bottleneck utility as an example. The first computing unit 13 uses the base values of the factors as a basis to compute a reference target total value as follows:

$$\text{Reference target total value} = 18{,}000 \times 90.37\% \times 100\% \times 1{,}778 -$$
$$(18{,}000 \times 89.3 + 18{,}000 \times 1{,}000)$$
$$= 9{,}314{,}615 \text{ (US\$)}$$

When the factor of bottleneck utility is increased by one percentage point (1%), then an upgraded target total value can be computed as follows:

$$\text{Upgraded target total value} = 18{,}000 \times 90.37\% \times 101\% \times 1{,}778 -$$
$$(18{,}000 \times 89.3 + 18{,}000 \times 1{,}000)$$
$$= 9{,}603{,}835 \text{ (US\$)}$$

Figure 4:
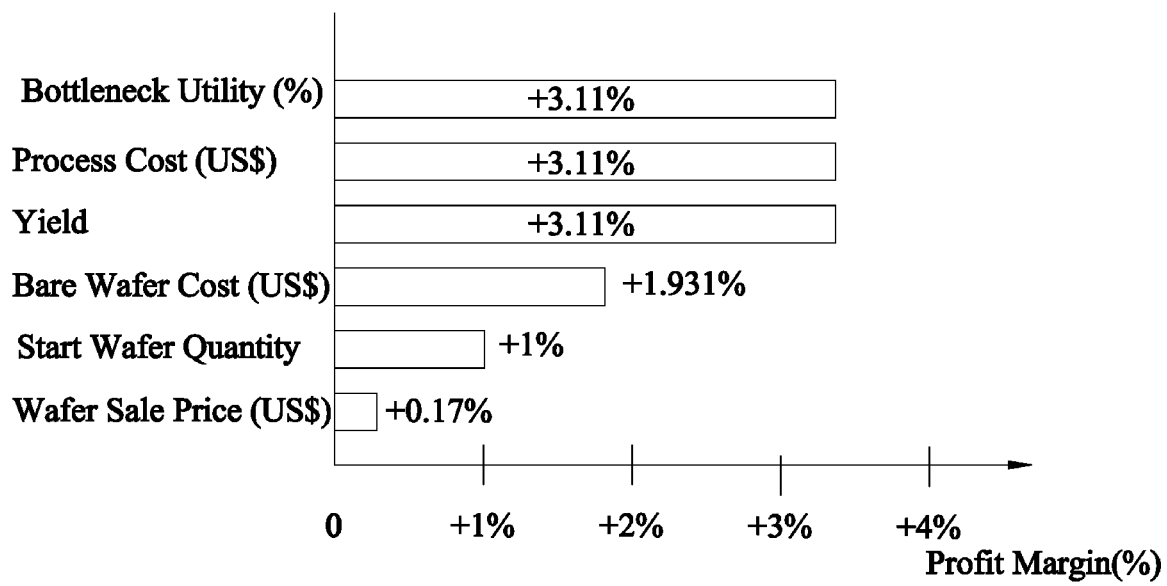
FIG. 4 is an ordination diagram listing the sensitivities of different factors in descending order, computed based on the second embodiment of the present invention.

Therefore, the target total value will increase by US$289,220 when the bottleneck utility is improved by one percentage point (1%). The second computing unit 14 uses a difference between the upgraded target total value and the reference target total value as a basis to compute and find the target total value is increased by 3.11%, which also represents the factor sensitivity of the factor of the bottleneck utility. Following the above computing method based on the bottleneck utility, the second computing unit 14 can sequentially compute the contribution of each of other factors on the target total value when the factor is improved by one percentage point (1%). By listing the level of influence of each of the factors on the target total value in descending order, an ordination diagram listing the factor sensitivity of each of the factors can be plotted as shown in FIG. 4. From FIG. 4, the influence of each factor on the target total value when the factor is improved by one percentage point (1%) can be clearly seen. The larger the factor improvement in percentage point is, the higher the upgraded benefit of the target total value can be obtained from the factor. Therefore, in further setting the factor improvement in percentage point for each of the factors, a decision maker can first consider the improvement of the factor that has the most significant sensitivity or contribution to the target total value.

Figure 5:
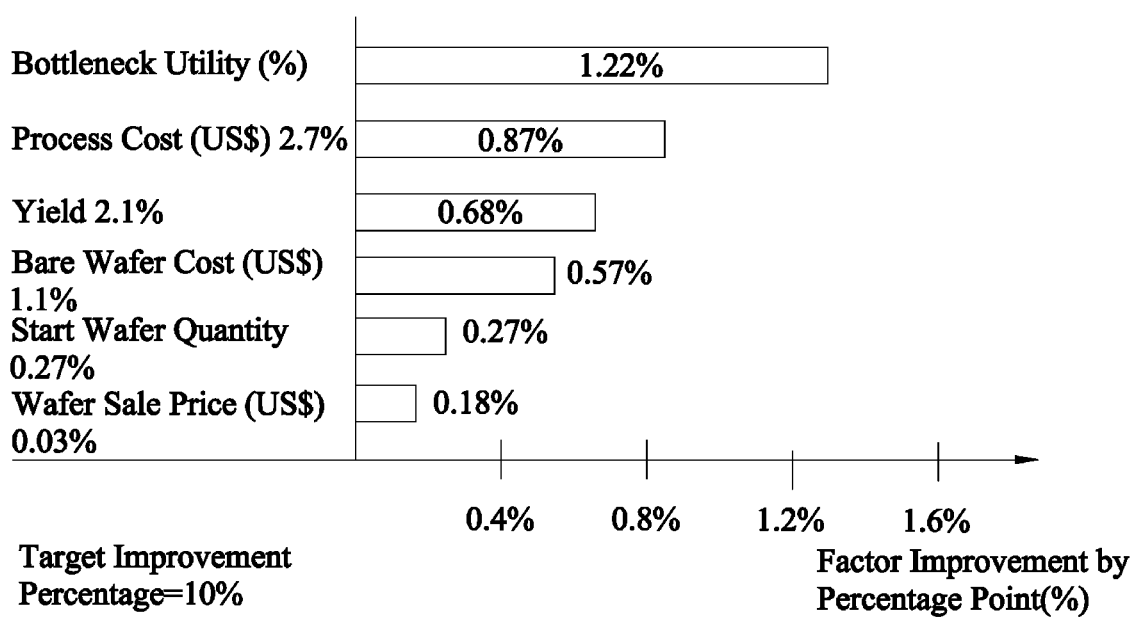
FIG. 5 is an ordination diagram showing the factor improvements of different factors in percentage point and the contribution of each of such factor improvements to a target total value in percentage.

The data receiving module 10 further receives a target improvement percentage. In the second embodiment, the target improvement percentage is 10%. That is, the decision maker wants to upgrade the reference target total value by 10% to achieve an upgraded target total value (i.e. profit) of US$10.2 millions. The decision maker can decide different combinations of factor improvements of different factors according to the target improvement percentage. The processing module 15 multiplies the factor improvement of each of the factors by the factor sensitivity thereof to thereby obtain the level of contribution of each of the factors to the target total value through the improvement of the factors. For example, when the bottleneck utility is improved by 1.22 percentage points, it will contribute to 3.8% of the upgraded target total value of US$10.2 millions, which is 10% higher than the reference target total value. In the above manner, the decision maker can know the level of contribution from different factor improvements of each of the factors to the upgraded target total value, as shown in FIG. 5. Thus, the decision maker would be able to set the factor improvement of each of the factors according to the upgraded target total value. By doing this, it would be helpful in the correct allocation of the limited resources available from the wafer plant and in further planning of operable ways for achieving the desired factor improvement of different factors.

Figure 6:
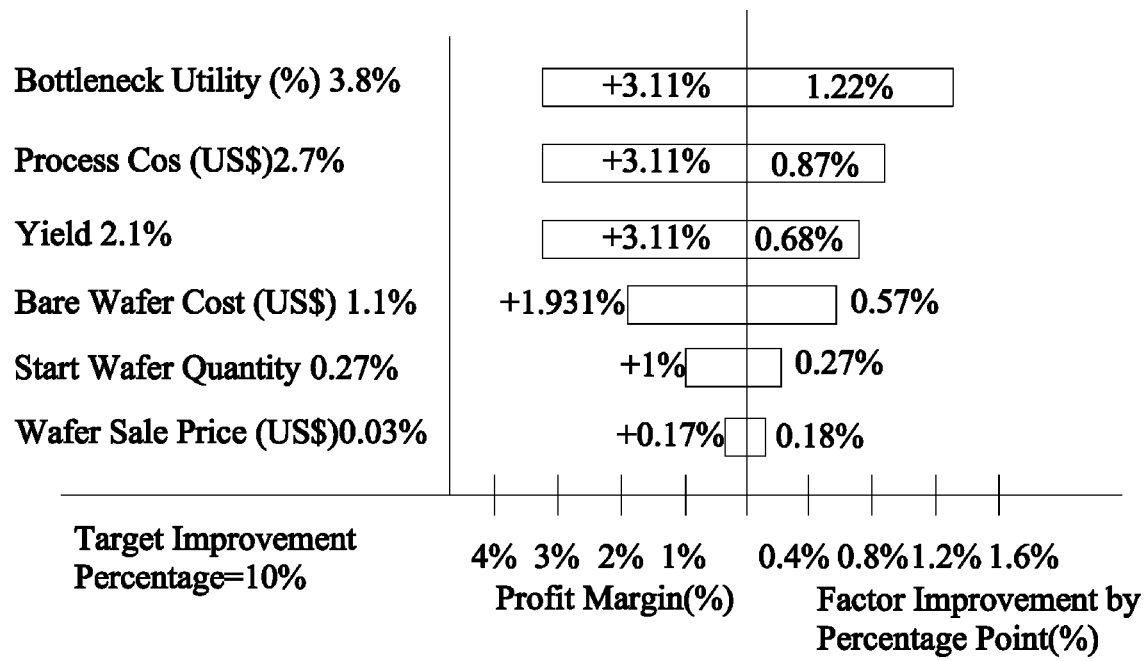
FIG. 6 is a composite ordination diagram showing the sensitivities and the contributions of multiple factors, obtained according to the second embodiment of the present invention.

FIG. 6 is a composite ordination diagram showing the sensitivities and the contribution levels of different factors in the second embodiment of the present invention. As can be seen from the left half of FIG. 6, the improvements in the bottleneck utility, the process cost and the yield have most significant influence on the upgrading of the target total value. And, the right half of FIG. 6 indicates the combination of different factor improvements of the factors for achieving the target improvement percentage. The composite ordination diagram helps a decision maker to locate the key direction of improvement, and allows the decision maker to flexibly make different combinations of the factor improvements without being restricted to one single or only a few factors. Through the small factor improvement in multiple factors, the planned target can be more efficiently and effectively achieved.

Figure 7:
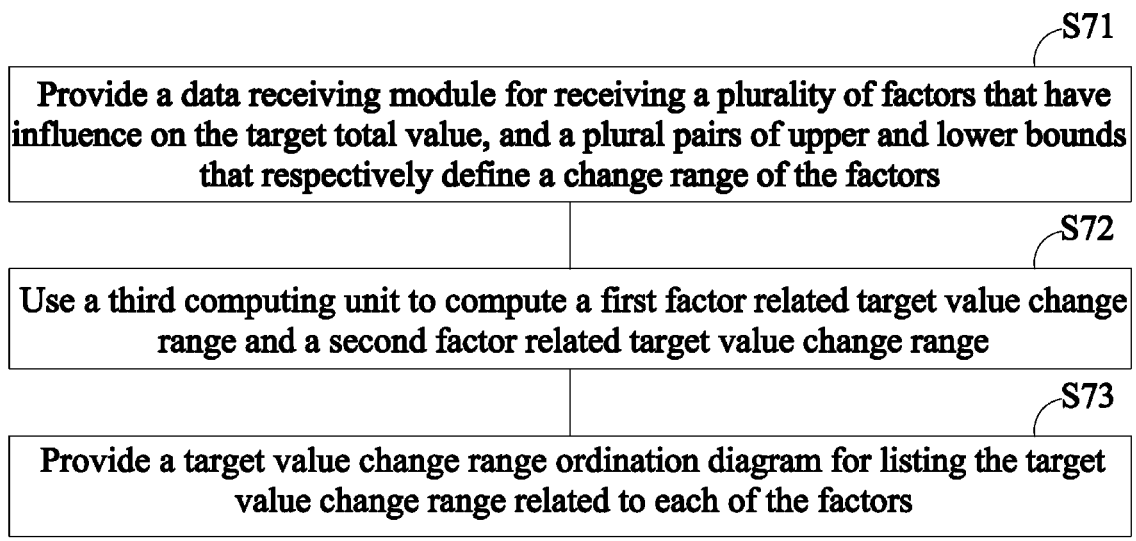
FIG. 7 is a first flowchart showing the steps included in a factor analysis method according to the present invention.

FIG. 7 is a first flowchart showing the steps included in a factor analysis method according to the present invention. First, in a step S71, a data receiving module is provided for receiving a plurality of factors that have influence on a target total value, and a plural pairs of upper and lower bounds defining a change range of the factors. The factors comprise a first factor and a second factor, the upper bounds comprise a first upper bound for the first factor and a second upper bound for the second factor, and the lower bounds comprise a first lower bound for the first factor and a second lower bound for the second factor. Then, in a step S72, use a third computing unit to compute a first factor related target value change range based on the first upper and lower bounds of the first factor, and compute a second factor related target value change range based on the second upper and lower bounds of the second factor. Finally, in a step S73, a target value change range ordination diagram is provided for listing the target value change range related to each of the factors.

Figure 8:
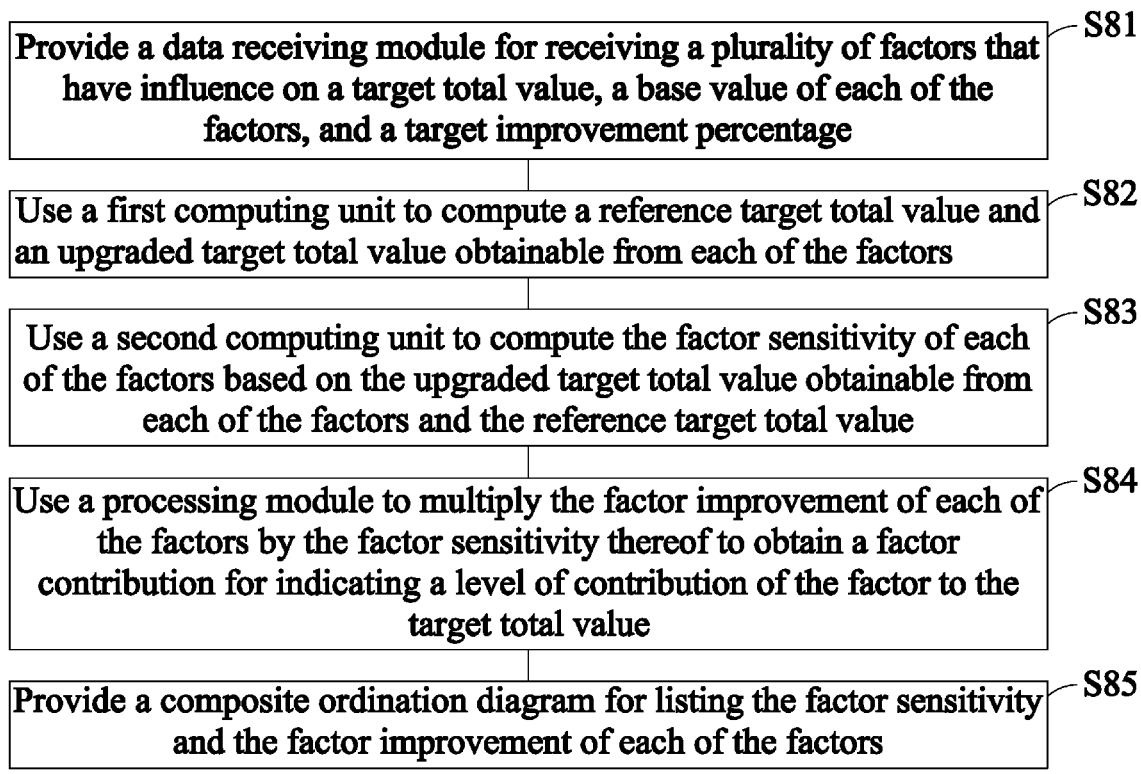
FIG. 8 is a second flowchart showing the steps included in the factor analysis method of the present invention.

FIG. 8 is a second flowchart showing the steps included in the factor analysis method according to the present invention. As shown, in a step S81, a data receiving module is provided for receiving a plurality of factors that have influence on a target total value, a plurality of base values corresponding to the factors, and a target improvement percentage. The factors comprise a first factor and a second factor, the base values comprise a first base value of the first factor and a second base value of the second factor, and the target improvement percentage comprises a first factor improvement in percentage point and a second factor improvement in percentage point. Then, in a step S82, use a first computing unit to compute a reference target total value based on the base values of the factors, compute a first upgraded target total value based on the first factor increased by one percentage point and the second base value of the second factor, and compute a second upgraded target total value based on the second factor increased by one percentage point and the first base value of the first factor. Then, in a step S83, use a second computing unit to compute a first factor sensitivity based on the first upgraded target total value and the reference target total value, and compute a second factor sensitivity based on the second upgraded target total value and the reference target total value. Then, in a step S84, use a processing module to multiply the first factor improvement by the first factor sensitivity to obtain a first factor contribution indicating a level of contribution of the first factor to the target total value, and multiply the second factor improvement by the second factor sensitivity to obtain a second factor contribution indicating a level of contribution of the second factor to the target total value. Finally, in a step S85, a composite ordination diagram is provided for listing the factor sensitivities and the factor improvements of the factors.

With the above-described factor analysis system and method thereof, it would be able to evaluate and compare the sensitivities of different factors, so as to find the key influential factors for use by a decision maker as a basis in deciding the optimal combination of different factor improvements to achieve the purpose of upgrading the operation target.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A factor analysis system, comprising:
    a data receiving module receiving a plurality of factors that have influence on a target total value, a plurality of base values corresponding to the factors, and a target improvement percentage; the factors comprising a first factor and a second factor, the base values comprising a first base value for the first factor and a second base value for the second factor, and the target improvement percentage comprising a first factor improvement in percentage point and a second factor improvement in percentage point;
    a first computing unit including an integrated circuit being connected to the data receiving module; the first computing unit using the base values of the factors as a basis to compute a reference target total value, and using the first factor increased by one percentage point and the second base value of the second factor as a basis to compute a first upgraded target total value, and using the second factor increased by one percentage point and the first base value of the first factor as a basis to compute a second upgraded target total value;
    a second computing unit including an integrated circuit being connected to the first computing unit; the second computing unit using the first upgraded target total value and the reference target total value as a basis to compute a first factor sensitivity, and using the second upgraded target total value and the reference target total value as a basis to compute a second factor sensitivity; and
    a processing module being connected to the second computing unit and the data receiving module; the processing module multiplying the first factor improvement by the first factor sensitivity to obtain a first factor contribution indicating a level of contribution of the first factor to the target total value, and multiplying the second factor improvement by the second factor sensitivity to obtain a second factor contribution indicating a level of contribution of the second factor to the target total value.

2. The factor analysis system as claimed in claim 1, further comprising a composite ordination diagram connected to the processing module for listing the factor sensitivities and the factor improvements of the factors.

3. The factor analysis system as claimed in claim 1, wherein the data receiving module further receives a plural pairs of upper and lower bounds that respectively define a change range of the factors; the upper bounds comprising a first upper bound and a second upper bound; and the lower bounds comprising a first lower bound and a second lower bound.

4. The factor analysis system as claimed in claim 3, further comprising a third computing unit connected to the data receiving module; the third computing unit using the first upper and lower bounds of the first factor as a basis to compute a first factor related target value change range, and using the second upper and lower bounds of the second factor as a basis to compute a second factor related target value change range.

5. The factor analysis system as claimed in claim 4, further comprising a target value change range ordination diagram connected to the third computing unit for listing the target value change range related to each of the factors.

6. A factor analysis method, comprising the following steps:
    providing a data receiving module for receiving a plurality of factors that have influence on a target total value, a plurality of base values corresponding to the factors, and a target improvement percentage; the factors comprising a first factor and a second factor, the base values comprising a first base value for the first factor and a second base value for the second factor, and the target improvement percentage comprising a first factor improvement in percentage point and a second factor improvement in percentage point;
    using a first computing unit including an integrated circuit to compute a reference target total value based on the base values of the factors, and compute a first upgraded target total value based on the first factor increased by one percentage point and the second base value of the second factor, and compute a second upgraded target total value based on the second factor increased by one percentage point and the first base value of the first factor;
    using a second computing unit including an integrated circuit to compute a first factor sensitivity based on the first upgraded target total value and the reference target total value, and compute a second factor sensitivity based on the second upgraded target total value and the reference target total value; and
    using a processing module to multiply the first factor improvement by the first factor sensitivity to obtain a first factor contribution indicating a level of contribution of the first factor to the target total value, and multiply the second factor improvement by the second factor sensitivity to obtain a second factor contribution indicating a level of contribution of the second factor to the target total value.

7. The factor analysis method as claimed in claim 6, further comprising the following step:
    providing a composite ordination diagram for listing the factor sensitivities and the factor improvements of the factors.

8. The factor analysis method as claimed in claim 6, further comprising the following step:
    using the data receiving module to receive a plural pairs of upper and lower bounds that respectively define a change range of the factors; the upper bounds comprising a first upper bound and a second upper bound; and the lower bounds comprising a first lower bound and a second lower bound.

9. The factor analysis method as claimed in claim 8, further comprising the following step:
    using a third computing unit to compute a first factor related target value change range based on the first upper and lower bounds of the first factor, and compute a second factor related target value change range based on the second upper and lower bounds of the second factor.

10. The factor analysis method as claimed in claim 9, further comprising the following step:

providing a target value change range ordination diagram for listing the target value change range related to each of the factors.

* * * * *